(12) United States Patent
Perbet et al.

(10) Patent No.: US 9,905,047 B2
(45) Date of Patent: Feb. 27, 2018

(54) METHOD AND SYSTEMS FOR GENERATING A THREE DIMENSIONAL MODEL OF A SUBJECT BY ITERATIVELY GENERATING MESHES

(71) Applicant: Kabushiki Kaisha Toshiba, Minato-ku (JP)

(72) Inventors: Frank Perbet, Cambridge (GB); Bjorn Stenger, Cambridge (GB); Minh-Tri Pham, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/921,908

(22) Filed: Oct. 23, 2015

(65) Prior Publication Data

US 2016/0117859 A1    Apr. 28, 2016

(30) Foreign Application Priority Data

Oct. 23, 2014   (GB) .................................. 1418867.6

(51) Int. Cl.
*G06T 17/20* (2006.01)

(52) U.S. Cl.
CPC ............ *G06T 17/20* (2013.01); *G06T 17/205* (2013.01); *G06T 2210/36* (2013.01)

(58) Field of Classification Search
None
See application file for complete search history.

(56) References Cited

U.S. PATENT DOCUMENTS

| 3,005,282 A | 10/1961 | Christiansen |
| 8,042,056 B2 * | 10/2011 | Wheeler ............. G06F 3/04845 715/764 |
| 2005/0168460 A1 * | 8/2005 | Razdan ............. G06F 17/30398 345/419 |

FOREIGN PATENT DOCUMENTS

| JP | H8-185545 | 7/1996 |
| JP | 2001-307073 | 11/2001 |

(Continued)

OTHER PUBLICATIONS

Catmull, Edwin, and James Clark, "Recursively generated B-spline surfaces on arbitrary topological meshes," Computer-aided design 10.6 (1978): 350-355.

(Continued)

*Primary Examiner* — Said Broome
(74) *Attorney, Agent, or Firm* — Oblon, McClelland, Maier & Neustadt, L.L.P.

(57) ABSTRACT

In one embodiment a method of generating a three dimensional model of a subject is disclosed. The method comprises receiving point cloud data for a subject; receiving user inputs indicating a plurality of cubes, and a grouping of the cubes into a plurality of blocks to form a representation of a class of subjects; generating a first mesh comprising a plurality of quadrilaterals by subdividing patches corresponding to faces of blocks of the plurality of blocks; fitting the first mesh to the point cloud data to generate a fitted mesh; iteratively generating further meshes, each comprising a plurality of quadrilaterals by subdividing patches of the fitted mesh from the previous iteration and fitting the further mesh to the point cloud data; and outputting as the three dimensional model of the subject the iteratively generated fitted mesh.

18 Claims, 14 Drawing Sheets

(56) References Cited

FOREIGN PATENT DOCUMENTS

JP          2014-21810        2/2014
JP          2014-186586       10/2014

OTHER PUBLICATIONS

Anguelov, Dragomir, et al, "Scape: shape completion and animation of people," ACM Transactions (TOG), vol. 24, No. 3. ACM, 2005.
Tobler, Robert F., and Maierhofer, Stefan, "A Mesh Data Structure for Rendering and Subdivision" WSCG '2006: Short Papers Proceedings: The 14-th International Conference in Central Europe on Computer Graphics, Visualization and Computer Vision 2006. University of West Bohemia, Pizen, Czech Republic.
United Kingdom Search Report dated Apr. 28, 2015 in Patent Application No. GB1418867.6.
Office Action dated Feb. 14, 2017 in Japanese Patent Application No. 2015-209075.
Japanese Office Action dated Aug. 22, 2017 in Japanese Patent Application No. 2015-209075.

\* cited by examiner

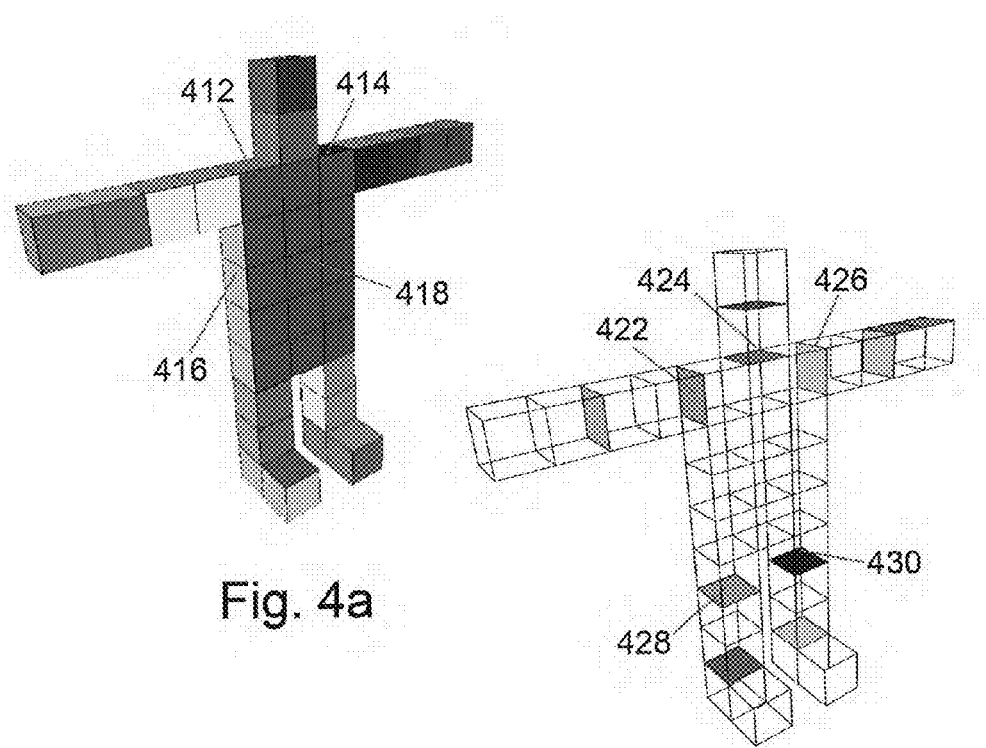
Fig. 4a
Fig. 4b
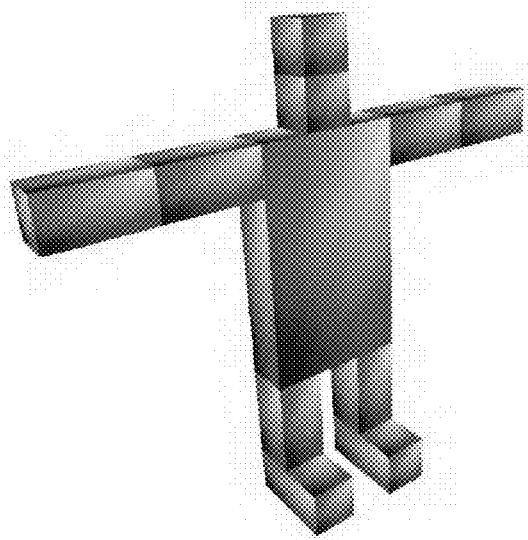
Fig. 4c

ND SYSTEMS FOR
METHOD AND SYSTEMS FOR GENERATING A THREE DIMENSIONAL MODEL OF A SUBJECT BY ITERATIVELY GENERATING MESHES

FIELD

Embodiments described herein relate generally the generation of three dimensional representations of subjects, such as humans.

BACKGROUND

The estimation of human body shape has a wide variety of applications, from medical to commercial domains. In medicine, for example, it may be possible to visualise future changes to a 3-D body to encourage lifestyle change. In the commercial domain accurate capture of nude body shape would allow virtual fitting; visualisation of the customer in different clothing.

Obtaining a desired shape for a subject such as a human is usually the result of fitting a mesh to data, such as images or 3D scans. Fitting algorithms can often achieve efficiency benefits from a course to fine representation.

BRIEF DESCRIPTION OF THE DRAWINGS

In the following, embodiments are described, by way of example only, with reference to the accompanying drawings in which:

FIG. 4a shows the generation of external patches in an embodiment:

FIG. 4b shows the generation of internal patches in an embodiment;

FIG. 4c shows parameterization of patches in an embodiment;

FIG. 11a shows a skeleton generated in an embodiment;

FIG. 11b shows the continuous rings input by a user to generate the skeleton shown in FIG. 11a;

DETAILED DESCRIPTION

Figure 1:
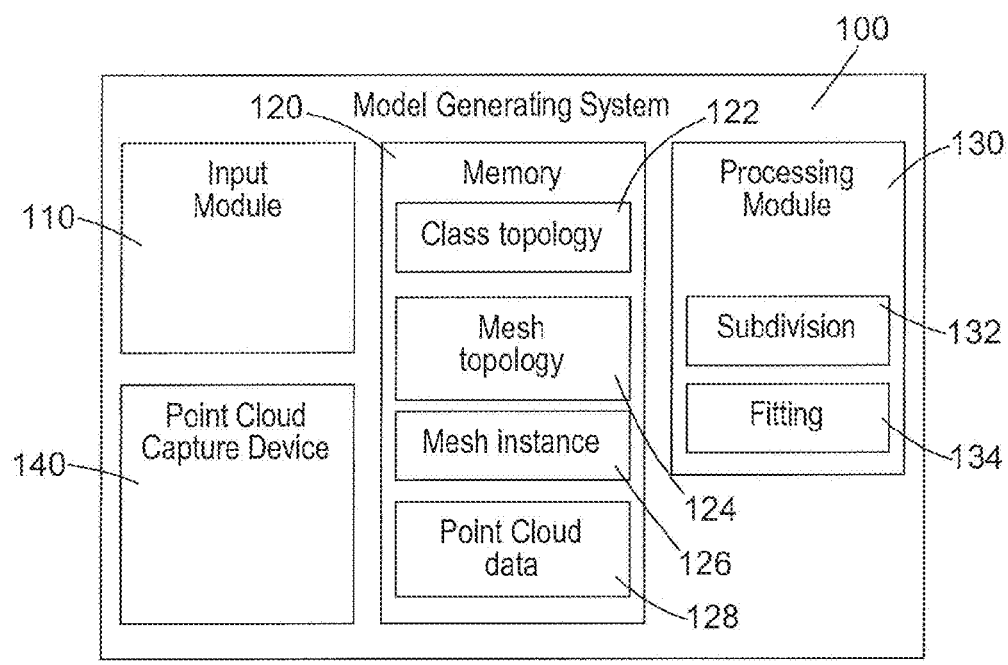
FIG. 1 shows a model generating system according to an embodiment.

In an embodiment a method of generating a three dimensional model of a subject is disclosed. The method comprises receiving point cloud data for a subject; receiving user inputs indicating a plurality of cubes, and a grouping of the cubes into a plurality of blocks to form a representation of a class of subjects; generating a first mesh comprising a plurality of quadrilaterals by subdividing patches corresponding to faces of blocks of the plurality of blocks; fitting the first mesh to the point cloud data to generate a fitted mesh; iteratively generating further meshes, each comprising a plurality of quadrilaterals by subdividing patches of the fitted mesh from the previous iteration and fitting the further mesh to the point cloud data; and outputting as the three dimensional model of the subject the iteratively generated fitted mesh.

The model may represent the three dimensional shape of the subject.

In an embodiment subdividing each mesh comprises subdividing patches corresponding to faces of the blocks at regular intervals along each edge of the face.

In an embodiment subdividing each mesh comprises subdividing a first patch corresponding to a face of a first block along a first edge with a first set of subdivisions and subdividing a second patch corresponding to a face of a second block adjacent to the first edge with a second set of subdivisions such that each subdivision of the first set connects to a corresponding subdivision of the second set at the first edge.

In an embodiment the class of subjects is human subjects.

In an embodiment the user inputs further comprise indications of locations of joints in a skeleton of the subject, the method further comprising generating a representative skeleton from the indications.

In an embodiment the indications of locations of joints comprise indications of a plurality of rings on the blocks indicating the locations of the joints.

In an embodiment the grouping of the cubes into a plurality of blocks comprises an indication of symmetry as correspondences between cubes.

In an embodiment the method further comprises capturing the point cloud data for the subject.

In an embodiment a method of generating a statistical model for the three dimensional shape of a class of subjects from three dimensional point cloud data for a plurality of test subjects within the class of subjects is disclosed. The method comprises for each test subject of the plurality of test subjects, iteratively generating models of increasing resolution by: fitting a first mesh to the point cloud data, the first mesh comprising a plurality of quadrilaterals formed by subdividing patches corresponding to faces of blocks of a plurality of blocks, each block of the plurality of blocks formed from at least one cube, to obtain a fitted first mesh; generating a second mesh by subdividing the fitted first mesh; and repeating the fitting and generating steps using the second mesh in place of the first mesh, and outputting the result of the iteration as a statistical model for the class of subjects.

The statistical model may be representative of the three dimensional shape of the class of subjects.

In an embodiment subdividing the first fitted mesh comprises subdividing a patches corresponding to faces of the blocks at regular intervals along each edge of the face.

In an embodiment subdividing the first fitted mesh comprises subdividing a first patch corresponding to a face of a first block along a first edge with a first set of subdivisions and subdividing a second patch corresponding to a face of a second block adjacent to the first edge with a second set of subdivisions such that each subdivision of the first set connects to a corresponding subdivision of the second set at the first edge.

In an embodiment the class of subjects is human subjects.

In an embodiment the method further comprises generating a representative skeleton for each of the test subjects.

In an embodiment the method further comprises enforcing at least one symmetry rule defined by correspondences between blocks of the plurality of blocks.

In an embodiment the method further comprises capturing the three dimensional point cloud data for each of the test subjects.

In an embodiment a method of generating a three dimensional representation of a subject from a depth image is disclosed. The method comprises fitting a first mesh to the depth image, the first mesh comprising a plurality of quadrilaterals formed by subdividing patches corresponding to faces of blocks of a plurality of blocks, each block of the plurality of blocks formed from at least one cube.

The first mesh may be a representation of the three dimensional shape of the subject.

In an embodiment the method further comprises capturing the depth image of the subject.

In an embodiment a system for generating a three dimensional model of a subject is disclosed. The system comprises a user interface configured to receive a user inputs indicating a plurality of cubes, and a grouping of the cubes into a plurality of blocks to form a representation of a class of subjects; a processor configured to generate a first mesh comprising a plurality of quadrilaterals by subdividing patches corresponding to faces of blocks of the plurality of blocks; fit the first mesh to point cloud data for a subject from the class of subjects to generate a fitted mesh; and iteratively generating further meshes, each comprising a plurality of quadrilaterals by subdividing patches of the fitted mesh from the previous iteration and fitting the further mesh to the point cloud data, the system being configured to output as the three dimensional model of the subject the iteratively generated fitted mesh.

The model may be a representation of the three dimensional shape of the subject.

One embodiment provides a computer program product comprising computer executable instructions which, when executed by a processor, cause the processor to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

Embodiments described herein relate to the generation and use of representations which are referred to in the following as CubeShapes for subjects such as humans.

FIG. 1 shows a model generating system according to an embodiment. The model generating system 100 comprises an input module 110, a memory 120, a processing module 130 and a point cloud capture device 140. The model generating system 100 may further comprise an output device, for example a network connection to output the models which it generates, alternatively, or additionally, the model generating system 100 may comprise a further processing module to process models which it generates and a display or other output device to output the results of the further processing.

The input module 110 allows a user to input a class topology which defines the approximate shape of a subject. The input module 110 may allow a user to input indications of a class topology using a mouse. The memory 120 comprises storage for a class topology 122, a mesh topology 124, a mesh instance 126 and point cloud data 128. The class topology 122 roughly describes the shape of a class of subjects such as humans as a set of cubes grouped into blocks. The mesh topology 124 describes a mesh or statistical model of the subjects at a given resolution. The mesh instance 126 is a mesh topology associated with 3D point and normals to represent the three dimensional shape of a subject. The point cloud data 128 is data indicating the three dimensional shape captured from a plurality of subjects.

The processing module 130 comprises a subdivision module 132 and a fitting module 134. The subdivision module 132 is configured to subdivide the class topology 122 to compute a mesh topology 124 and to subdivide a mesh topology 124 to compute a further mesh topology of a higher resolution. The fitting module is configure to fit the mesh topology 124 to the point cloud data 128 to compute a mesh instance 124. This is achieved using for example non-rigid ICP.

The point cloud capture device 140 is for example a laser scanner configured to capture point cloud data from subjects.

Figure 2:
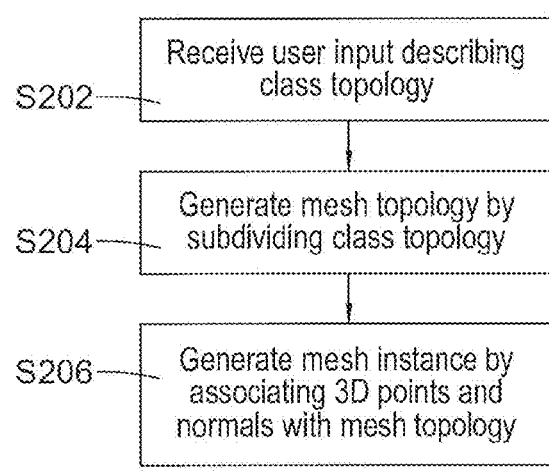
FIG. 2 shows a method of generating a representation of a subject according to an embodiment.

FIG. 2 shows a method of generating a representation of a subject according to an embodiment. In step S202, a user input describing a class topology is received. The user describes the class-topology, that is, the topology of the class of objects to be represented. In step S204, a mesh topology is generated by subdividing the class topology. The class-topology can then be subdivided into a mesh-topology given some subdivision parameters. In step S206, a mesh instance is generated by associating three dimensional points and normals with the mesh topology.

A class-topology is formally defined as a graph of blocks $G_{block}(V_{block};E_{block})$. A block $b \in V_{block}$ is an axis-aligned discrete 3D box, which can be defined as (origin, size)$\in \mathbb{N}^3 \times \mathbb{N}^{+3}$, where origin and origin+size are the two diagonally opposite corners of the box. Two blocks $b_i$; $b_j$ are connected, that is $(b_i,b_j) \in E_{block}$, if and only if they are adjacent (block collisions are not allowed). The discrete 3D space $\mathbb{N}^3$ in which the boxes exist is referred to as the cube space.

In practice, an editor allows quick creation of a class-topology in two steps using simple mouse interactions.

Figures 3A, 3B:
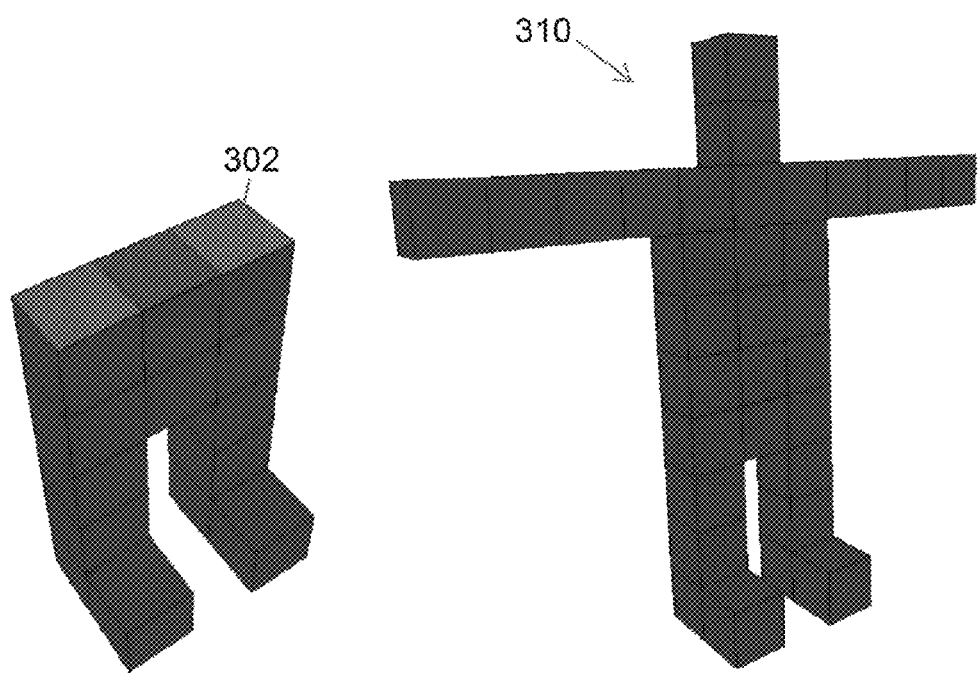
FIGS. 3a, 3b, and 3c show user input of a class topology according to an embodiment.
Figure 3C:
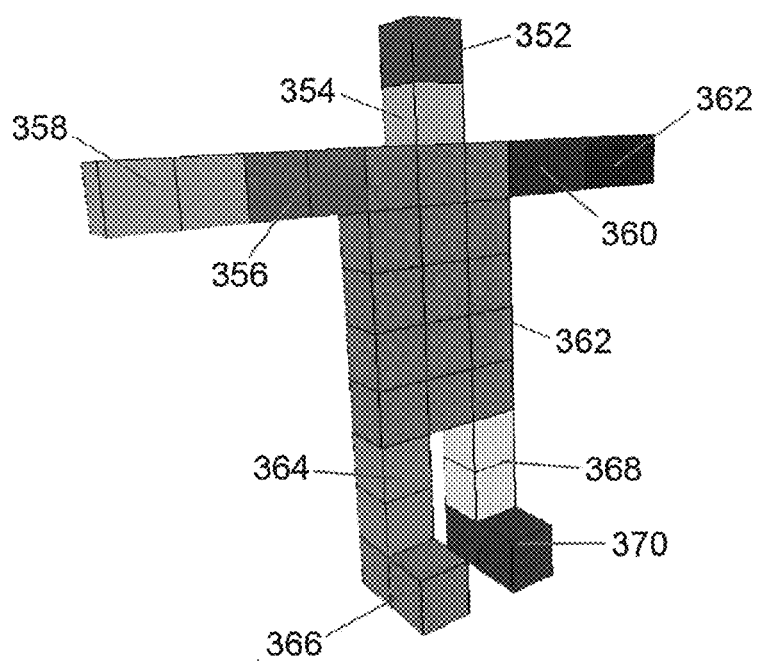

FIG. 3 shows user input of a class topology according to an embodiment. First, as shown in FIG. 3a, a user adds new cubes 302 to approximate the shape of the class of objects. Defining the geometric topology correctly is important. Approximating the proportions prevents the quads of the mesh to be too stretched. Selecting multiple cubes allows adding several cubes with one click, allowing for faster modelling. FIG. 3b shows the completed set of cubes. Then the user groups the cubes into blocks. This is shown in FIG. 3c. Blocks are named, preferably using meaningful semantic information. This may be, for example "arm" or "leg" in the case of a human. As shown in FIG. 3c, the cubes are grouped into the following blocks: head 352, neck 354, upper right arm 356, lower right arm 358, upper left arm 360, lower left arm 362, torso 362, right leg 364, right foot 366, left leg 368 and left foot 370.

It is noted that the procedure described above is the only user interaction required and the remaining steps are computed automatically from the given graph $G_{block}$.

The two main operations that are applied to the arrangement of cubes are: subdivision to change the mesh resolution and deformation to fit the surface to a point cloud. It is noted that no operation changes the topology of the shape. Here, the topology is defined so that the human shape is seen as a smooth manifold with boundary.

The use of a topology constructed from cubes arranged to approximate the shape of the subject, for example a human has two benefits. Firstly, sampling: using a simple shape such as a cube to represent a human shape would lead to a mesh with highly over-stretched quads. For instance, the arms would need to be pulled out of the original cube. Such stretched quads are not desirable in many contexts and are usually removed using re-meshing techniques. Note that they are some flexibility with the way cubes can be subdivided but as a rule of thumb, the closer the shape is from a generic shape, the more regular the vertex sampling will be and the more "square" the quads will be. Secondly, there is a semantic reason: blocks can be identified with relevant names, like "torso" for instance. As will be seen below, this is extremely handy in several situations. But using a simple cube to describe a human shape would not allow to access separate limbs individually, which would not be very helpful.

Once the 3D blocks have been defined, surface patches are generated from the blocks.

FIG. 4a shows the generation of external patches in an embodiment. Once the 3D blocks have been defined, corresponding 2D patches are automatically generated. A patch $p_i$ is one face of a block, it is parameterized in $[0,1]^2$. As shown in FIG. 4a, four patches 412 414 416 and 418 on the surface of the torso are visible.

A patch can be external or internal. FIG. 4b shows internal patches in an embodiment. As shown in FIG. 4b an internal patch 422 joins the upper right arm to the torso, an internal patch 424 joins the torso to the neck, an internal patch 426 joins the torso to the upper left arm, an internal patch 428 joins the torso to the right leg and an internal patch 430 joins the torso to the left leg. Only external patches are used for describing the surface of a subject. The patches can be represented by a graph $G_{patch}(V_{patch}, E_{patch})$ where two patches are connected, that is $(p_i,p_j) \in E_{patch}$ if and only if they are adjacent.

FIG. 4c shows the parameterization of patches. Locations on the patches are parameterized as $(u,v) \in [0,1]^2$, where u maps to red and v maps to green. The elements of $E_{patch}$ can be interpreted geometrically as the edges between adjacent patches. The patches are named automatically from the block names by adding the relevant post_x: right/left, bottom/top, back/front (respectively mapping to the positive/negative direction x, y and z). The names can be manually changed to something more meaningful. Meaningful naming of the blocks and patches will ease the programmatic access to the mesh.

In order to fully define a class-topology some rules need to be defined about how the blocks/patches will be subdivided into a mesh-topology. To understand these rules, it is pointed out that by design we expect a watertight mesh made of quads only. In order to keep the mesh well connected and avoid so-called "T-junctions", we need to make sure that the patches are subdivided in a consistent manner. More precisely, a subdivision must obey two rules:

1. Regularity: a patch can only be subdivided using a regular grid. That is, all the squares of a patch must be subdivided equally along a given direction.

2. Connectedness: two adjacent patches must be subdivided so that the adjacent squares.

Figure 5A:
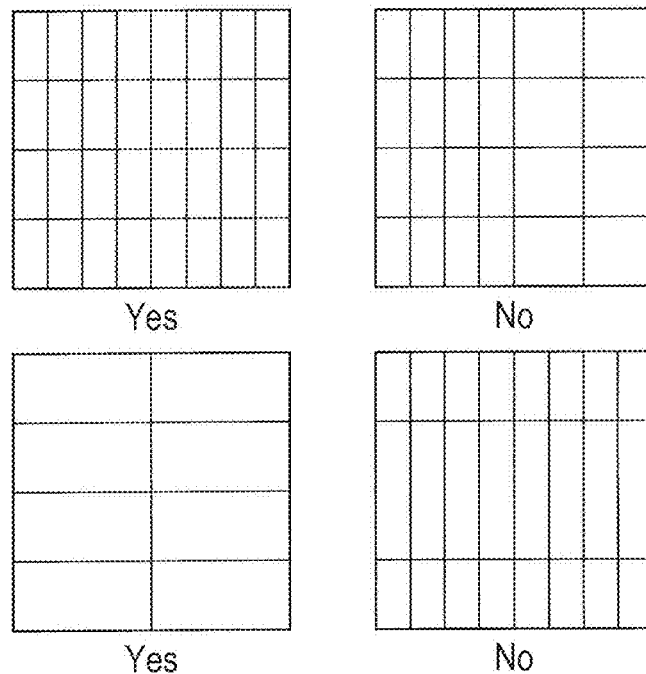
FIG. 5a shows examples of a regularity rule in an embodiment.

FIG. 5a shows examples of the regularity rule. By design, a subdivided patch is accessed as an image would be, using a simple regular grid with "pixels" of equal sizes. The examples on the left hand side are divided equally in the horizontal and vertical directions. Therefore the examples on the left hand side satisfy the regularity rule. The top right example is not divided equally in the horizontal direction. The bottom right example is not divided equally in the vertical direction. Therefore the examples shown on the right hand side do not satisfy the regularity rule.

Figure 5B:
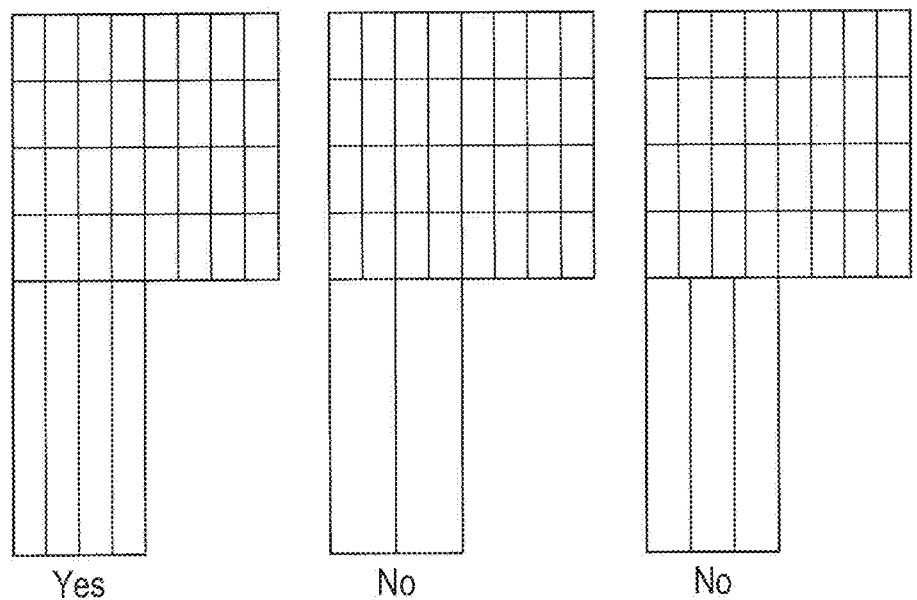
FIG. 5b shows examples of a connectedness rule in an embodiment.

FIG. 5b shows examples of the connectedness rule. In the first example, the divisions of the upper patch are all connected to divisions on the lower patch. Therefore the first example satisfies the connectedness rule. In the second example there are divisions on the upper patch which do not continue onto the lower patch. Therefore the second example does not satisfy the connectedness rule. In the third example there are divisions on the upper patch which do not connect with divisions on the lower patch and also divisions on the lower patch which do not connect to divisions on the upper patch. Therefore, the third example does not satisfy the connectedness rule.

The rules tend to propagate subdivisions across the surface and form groups of patches subdivided similarly. Those groups can be described as the equivalence-classes of binary relations between blocks ~d where d∈x,y,z is a dimension. Using the binary relation formalism, the two rule above become:

1. Regularity: for any patch p spanning the two dimensions $d_i,d_j$:$p \sim d_i p$ and $p \sim d_j p$ (reflexivity)

2. Connectedness: given two adjacent patches $p_i,p_j$:$p_i \sim_d p_j$ and $p_j \sim_d p_i$ where d is the direction of the edge $p_i \cap p_j$, it can be shown that: if $p_i \sim_d p_j$ and $p_j \sim_d p_k$ then $p_j \sim_d p_k$ (transitivity).

Figure 6A:
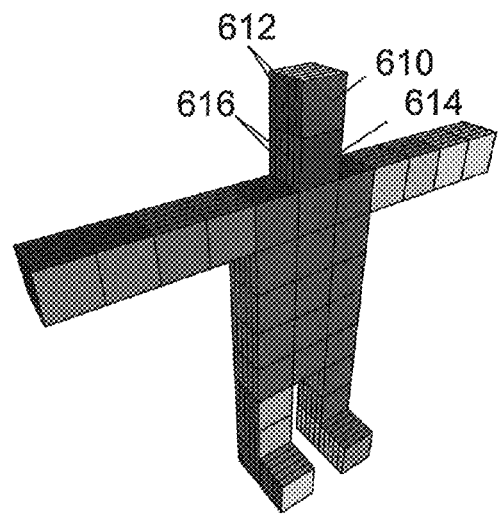
FIGS. 6a to 6c show examples of the effects of applying a subdivision rule in an embodiment.
Figure 6B:
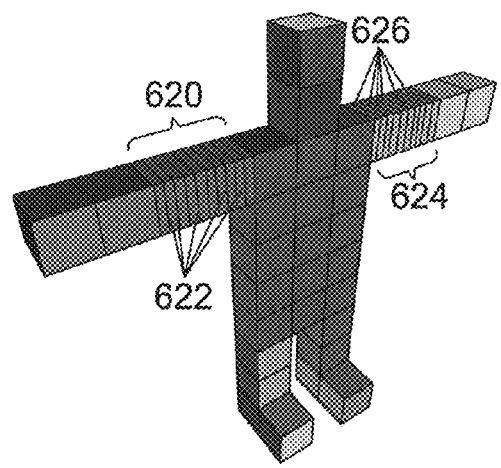
Figure 6C:
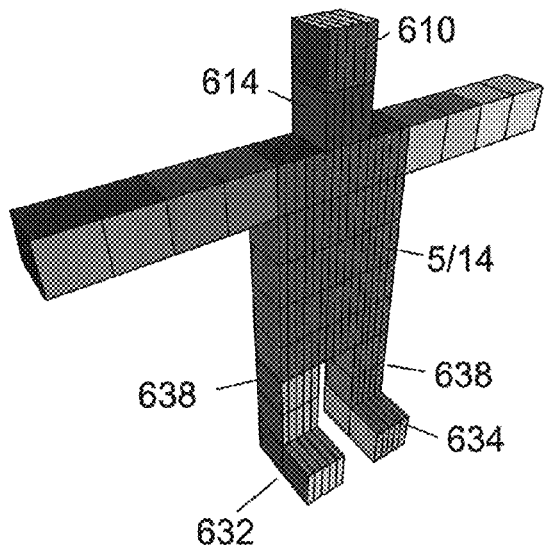

FIGS. 6a to 6c show examples of the effects of applying the subdivision rule.

FIG. 6a shows an example in which subdivisions are made parallel to the plane of the torso. As shown in FIG. 6a, the patches on the sides of the block 610 forming the head are in the vertical direction by a plurality of divisions 612. The patches on the sides of the block 614 forming the neck are also divided by a plurality of divisions 616 which match the divisions 612 on the patches on the sides of the block 610 forming the head. As shown in FIG. 6a, the patches on the sides of the other blocks are also divided with corresponding divisions.

FIG. 6b shows an example in which the blocks forming the arms are subdivided. As shown in FIG. 6b, the patches on the top and the front of the block forming the right arm are divided by a plurality of divisions 622. Here it is noted that the divisions on patch forming the front of the right arm continue on the patch forming the top of the right arm. The patches on the top and front of the block forming the left arm 624 are divided by a corresponding set of divisions 626.

FIG. 6c shows a subdivision of the subdivision domain described by (i) its dimension: x (ii) a list of blocks: right foot 632, left foot 634, right leg 636, left leg 638, torso 640, neck 614, head 610. Similarly to blocks and patches, giving a semantically meaningful name to each subdivision domain is encouraged. For instance, the above example could be named torso right left. Some subdivision domains can be merged for symmetry reasons. For example the two legs of a human shape: it makes sense to subdivide them equally along the bottom/up direction.

These binary relations naturally form equivalence classes, where each of the classes is called a subdivision domain.

Note that given a dimension d, it can be proven that all the patches of a given block either (i) belong to the same equivalence class or (ii) are perpendicular to d and are not affected by subdivision in this dimension. This property makes it easier to describe a given a subdivision domain: it is simply defined as a dimension d and by all the blocks $b_i$ whose non-perpendicular patches are in the same equivalence class.

Figure 7:
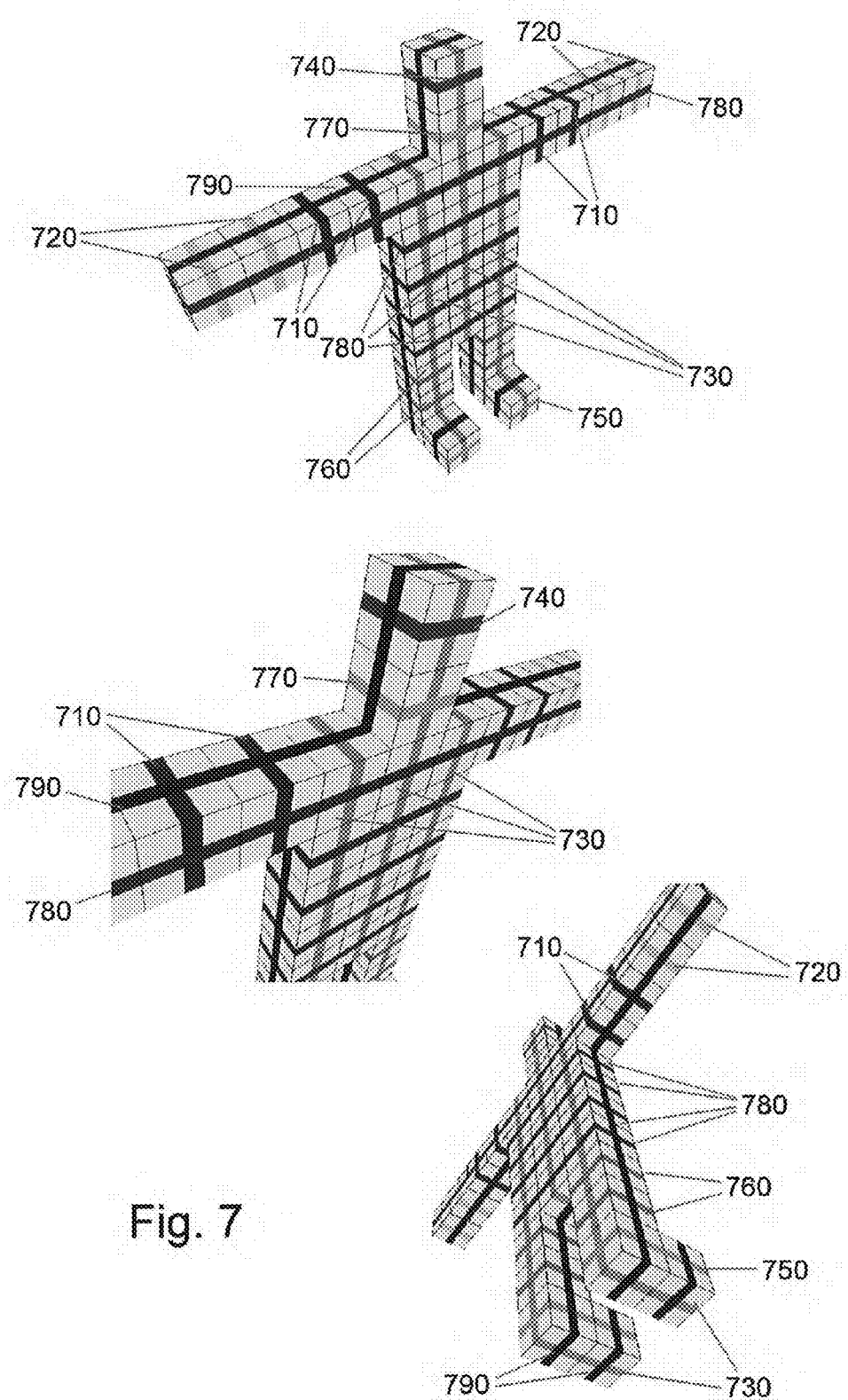
FIG. 7 shows the subdivision domains for a human subject in an embodiment.

FIG. 7 shows the subdivision domains for a human subject. As shown in FIG. 7 in the case of a human shape, nine subdivision domains can be defined. These subdivision domains are: arm right left 710, hand right left 720, torso right left 730, head bottom top 740, foot bottom top 750, leg bottom top 760, neck bottom top 770, torso bottom top 780, all back front 790. It means that subdividing a class-topology into a mesh-topology is a function which takes nine input parameters (nine degrees of freedom). The vector containing these parameters is called the subdivision vector. It is noted that FIG. 6a shows the all back front 790 subdomain division, FIG. 6b shows the arm right left 710 subdomain division and FIG. 6c shows the torso left right 730 subdomain division.

FIG. 8 shows three different subdivision parameters of a registered human shape corresponding to different subdivision vectors.

Figure 8A:
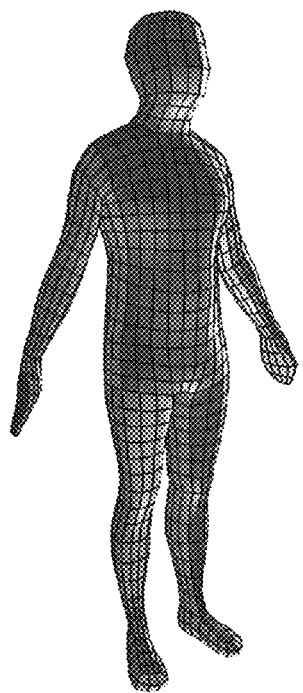
FIGS. 8a to 8c show three different subdivision parameters of a registered human shape corresponding to different subdivision vectors.

FIG. 8a shows subdivision parameters of a registered human shape corresponding to a subdivision vector [5; 2; 3; 4; 2; 7; 3; 3; 3].

Figure 8B:
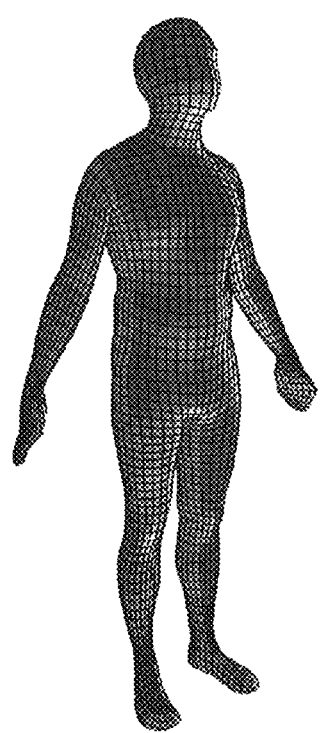

FIG. 8b shows subdivision parameters of a registered human shape corresponding to a subdivision vector [10; 4; 5; 9; 3; 15; 5; 5; 5].

Figure 8C:
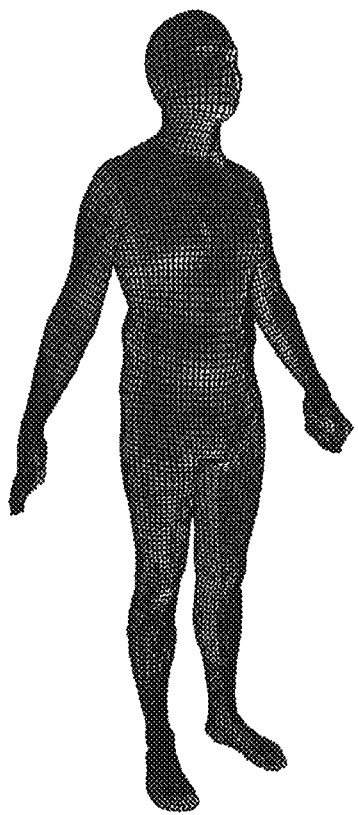

FIG. 8c shows subdivision parameters of a registered human shape corresponding to a subdivision vector [20; 7; 10; 17; 6; 29; 8; 9; 8].

Note that the numbers in the subdivision vectors have been chosen to minimize the stretch of each quad and correspond to the number of divisions in each of the subdivision domains in the order listed above in the description of FIG. 7. The three dimensional points are the result of a non-rigid registration algorithm.

Formally, creating a mesh-topology is straightforward: each patch is divided using the two relevant numbers in the subdivision vector. The result of the operation can be seen as a graph of quads $G_{quad}(V_{quad};E_{edge})$ and a graph of vertices $G_{vertex}(V_{vertex};E_{edge})$. Note that the set of edges $E_{edge}$ is common to $G_{quad}$ and $G_{vertex}$.

As defined earlier, the discrete 3D space $\mathbb{N}^3$ in which the cubes exist before subdivision is referred to as the cube space. The subdivision can also be described as acting on a volume rather than on a surface: the cubes are subdivided into voxels. It is convenient to refer to a voxel using two coordinates $(c,\hat{c})\in\mathbb{N}^3\times\mathbb{N}^3$ where c belongs to the cube space and refers to the cube that contains the voxel, and $\hat{c}$ is the coordinate of the voxel within the (subdivided) cube. In this context, the space $\mathbb{N}^3\times\mathbb{N}^3$ is referred to as the voxel space.

Figure 9:
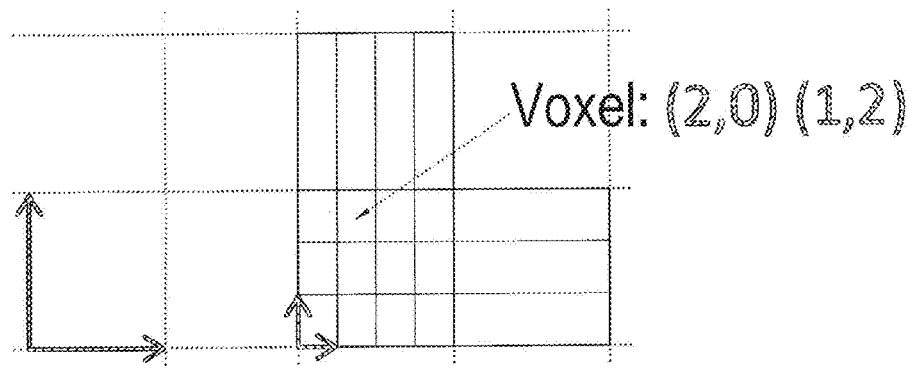
FIG. 9 shows an example of a location of a voxel in a voxel space in an embodiment.

FIG. 9 shows an example of a location of a voxel in the voxel space $(c,\hat{c})\in\mathbb{N}^3\times\mathbb{N}^3$ with c=(2,0) and $\hat{c}$=(1,2).

Once a mesh-topology has been created, in order to obtain a mesh-instance one needs to assign 3D points to each vertex in $V_{vertex}$. In summary, the class-topology describes a class of objects (e.g. human body shapes), the mesh-topology describes a mesh at a specified resolution (but without any knowledge of a particular individual's shape), and the mesh-instance is a 3D mesh of a particular individual at a specified resolution.

Embodiments of the CubeShape provide a simple mesh representation which facilitates certain operations.

Given a CubeShape, it is straightforward to compute rings (also called loops) over the surface (like a bracelet, for instance). The mesh being defined by quads only, rings can be created by specifying a start position and a direction in the voxel space. The ring is then automatically defined. Some care must be taken when extraordinary points (that is, points whose number of neighbours is not 4) are along the path.

Figures 10A, 10B:
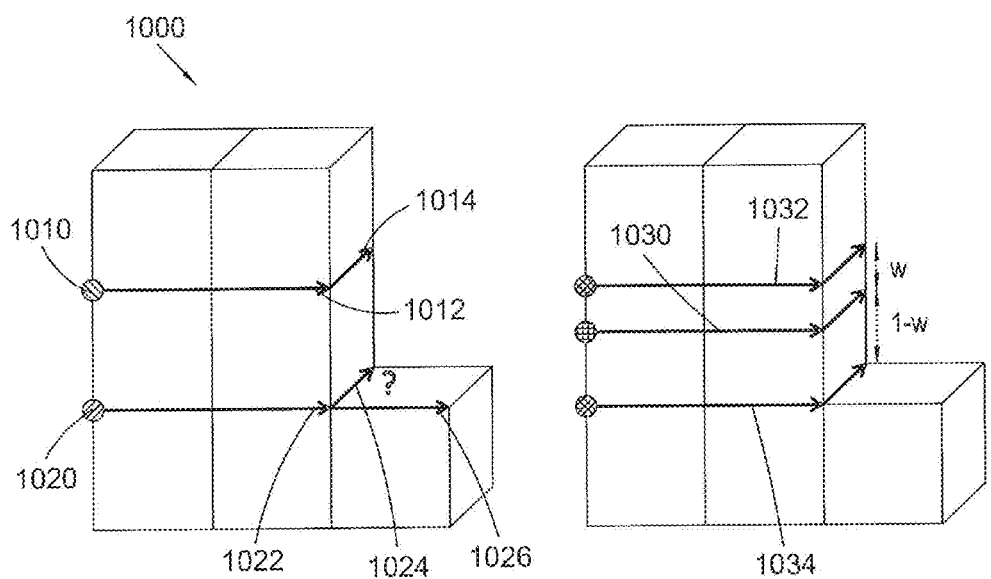
FIG. 10a shows examples of definitions of rings in an embodiment.
FIG. 10b shows the definition of a continuous ring in an embodiment.

FIG. 10a shows examples of an unambiguous ring and an ambiguous ring. The rings are defined on a plurality of cubes 1000 in voxel space. The first ring is created by specifying a start position 1010 and a direction shown by the arrow 1012. The path 1014 of the first ring is unambiguous as at each point there are 4 neighbours. A second ring is created by specifying a start position 1020 and a direction shown by the arrow 1022. However, because the second ring passes through a point where there are 5 neighbours, there is an ambiguity as to whether the ring should follow a first path 1024 or a second path 1026. In this case, going straight is ambiguous and the user must provide further specification Note that the previously defined rings are called discrete rings as they are computed on the mesh-topology. They cannot be used to define a ring at mid-height of the torso, for example, because depending on the subdivision vector, vertices might not exist at precisely that height.

FIG. 10b shows the definition of continuous rings which can be defined anywhere on the mesh-topology. In order to define a continuous ring 1030, two consecutive discrete rings 1032 and 1034 are defined and an interpolation weight w between them is given. Continuous rings are important because they allow defining rings independently of a mesh-topology. Only the class-topology is needed and the height can be specified in the parameterized space of a patch.

Continuous rings can be used to generate a skeleton of the shape.

Figures 11A, 11B:
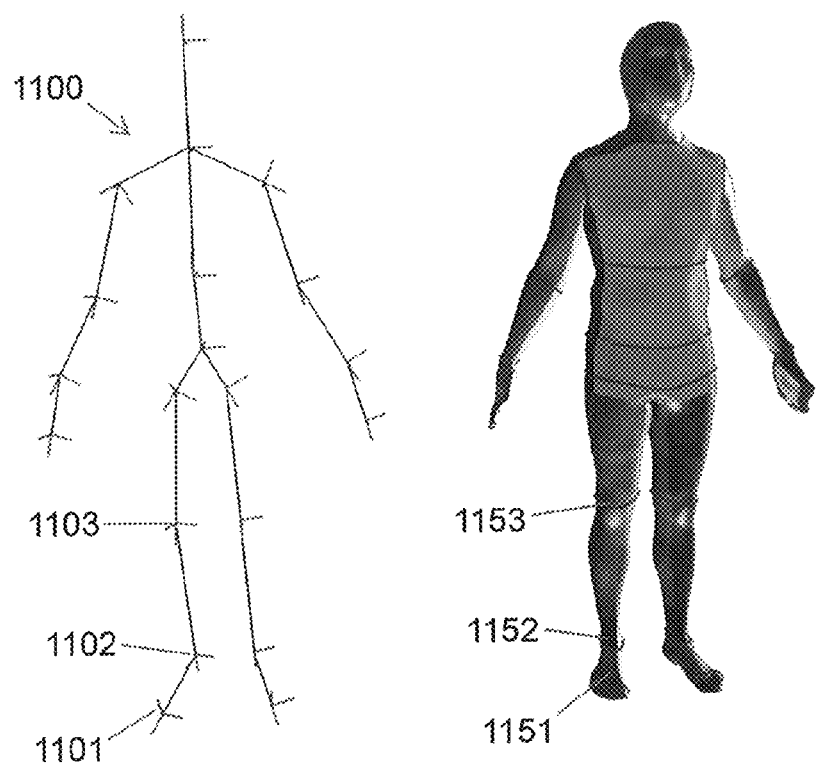

FIG. 11a shows a skeleton generated in an embodiment. The skeleton 1100 can be used to deform the shape by rotating bones in the skeleton around their respective joints. The topology is given by the user. The skeleton comprises a plurality of joints 1101 1102 1103 and connections between the joints. The method used to generate the skeleton is a heuristic to approximate an anatomical skeleton. It is nevertheless useful to perform simple task like animating the human shape in a convincing manner. The skeleton generation is based on continuous rings and the mesh-topology is not required.

FIG. 11b shows the continuous rings input by a user. Each ring input by the user corresponds to a joint in the skeleton. As shown in FIG. 11a, a ring 1151 around the right foot of the subject corresponds to a joint 1101 in the foot of the skeleton. A ring 1152 around the right ankle of the subject corresponds to a right ankle joint on the skeleton. A ring 1153 around the right knee of the subject corresponds to the right knee joint on the skeleton.

It is noted that the rings here are manually chosen and do not correspond to the true anatomic skeleton. The code skeleton generation is not shown here, but would typically create the elbow joint at the average of the points in the elbow ring. The joint orientations are computed using a combination of geometric conventions. For instance, the x-axis is aligned with the previous joint and, in the case of the elbow, the y-axis is as close as possible to the general right-left direction of the human shape.

An advantage is that the skeleton generation algorithm is independent of the subdivision. The generating a skeleton is fast (tens of milliseconds on a modem machine) because many values can be pre-computed. Given a mesh-topology, all the continuous rings can be computed and cached as they do not require any 3D knowledge of a mesh-instance. Once cached, and given a new mesh-instance, the continuous rings can be re-used in order to produce a new skeleton.

Once a skeleton has been generated, it can be used for Linear Blend Skinning (also known as Skeletal Subspace Deformation) using the standard equation:

$$v'_i = \sum_j w_{ij} M'^{-1}_j M_j v_i$$

where $v_i$ is the vertex position in neutral pose (also called dress pose), $v'_i$ is the skinned vertex position, $M_j$ is the object-to-joint dress-pose transformation of the joint j and $M'_j$ is the object-to-joint skinned transformation of joint j.

Note that this equation can be inverted in order to unskin a mesh:

$$v_i = \left(\sum_j w_{ij} M'^{-1}_j M_j v_i\right)^{-1} v'_i$$

This is useful if, given a CubeShape in an unknown pose, one wants to retrieve the shape in the neutral pose.

Skinning requires computing the skinning weights $w_{ij}$. In the Computer Graphics industry this is typically done manually by an artist. An alternative is to learn the weights from a database of people in different poses. While the algorithm infers automatically how the bones influence the surface, it can be beneficial to limit the influence of the bone over the mesh.

Figure 12:
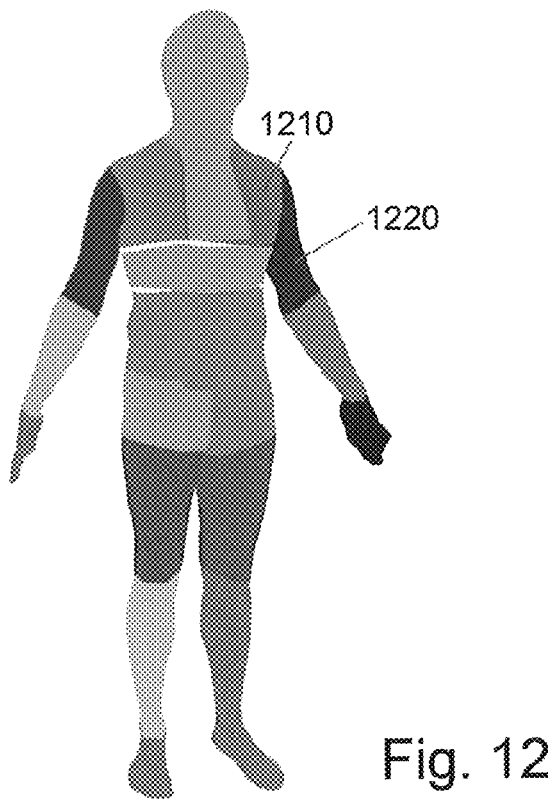
FIG. 12 shows definitions of influence areas in the parameterized domain in an embodiment.

FIG. 12 shows definitions of influence areas in the parameterized domain in an embodiment. Using the parameterization of the patch, areas over the surface can be defined and used to guide the skinning-weight learning process. In this case, the left shoulder bone is limited by the left upper-arm area 1210 combined with the left upper-torso area 1220.

Exploiting naturally occurring symmetry can be useful in many ways. In the case of the human body shape it can be used to generate the right-left symmetry of a given shape. A simple reason for this is to double the size of a database of registered meshes at no additional cost. Given its regular structure, it is easy to describe symmetry at the graph-topology level: blocks are simply put into correspondence. For instance, the right-left symmetry of a human shape can be described, in the case of the arms, by putting the left arm and the right arm block into correspondence.

Symmetry can be similarly applied to the continuous rings and the influence area, since the symmetry is defined at the graph-topology level, it can be evaluated for any mesh resolution. Generally any tools applied to the CubeShape should be defined as acting on the graph-topology, ensuring that the tool is independent of the mesh resolution.

Landmarks can be defined at the graph-topology level by providing (i) the patch and (ii) the u; v parameterization within this patch. For instance, the landmark of the left knee crease is defined as belonging to the patch left leg back with the parameterization 0:5; 0:5.

Figure 13A:
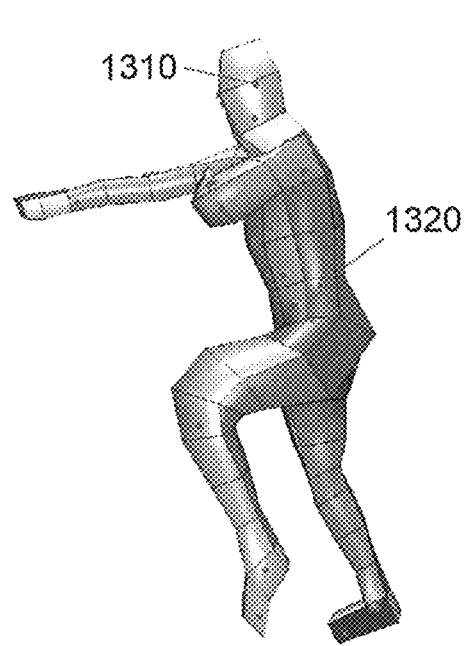
FIGS. 13a to 13c show landmarks computed at different levels of subdivision in an embodiment.
Figure 13B:
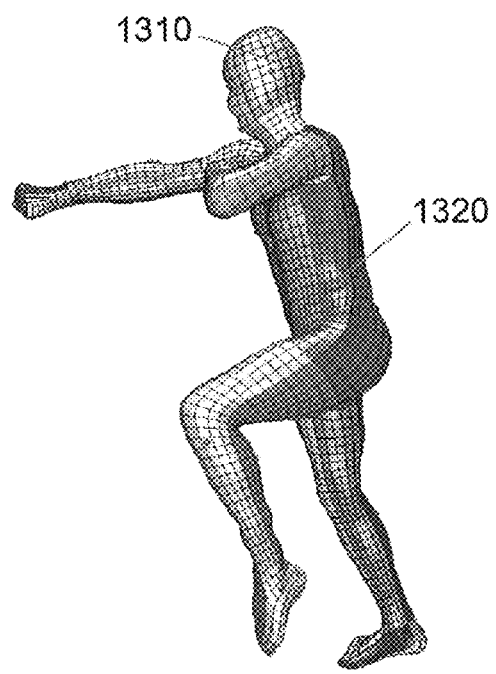
Figure 13C:
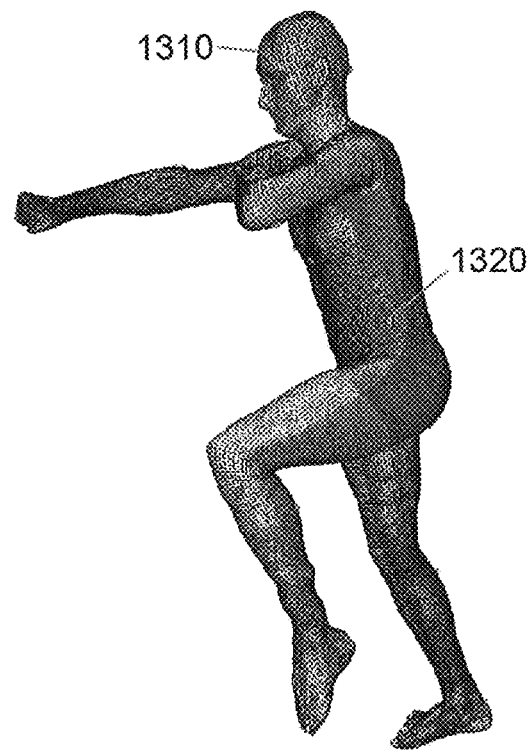
Figure 14A:
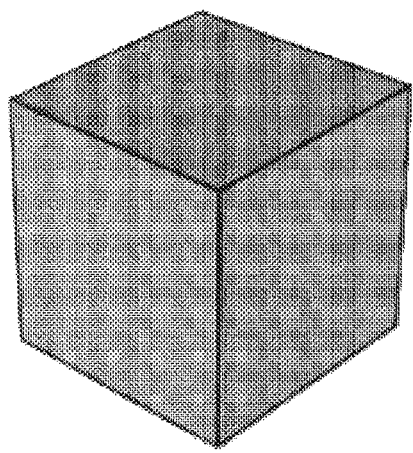
FIGS. 14a to 14e show different subdivision of a Catmull-Clark subdivision scheme.
Figure 14B:
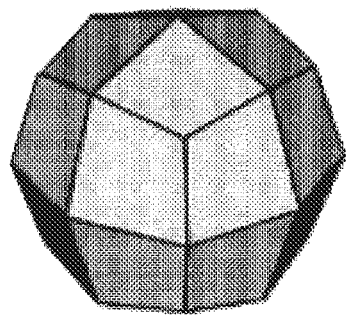
Figure 14C:
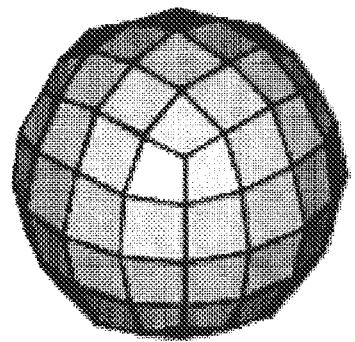
Figure 14D:
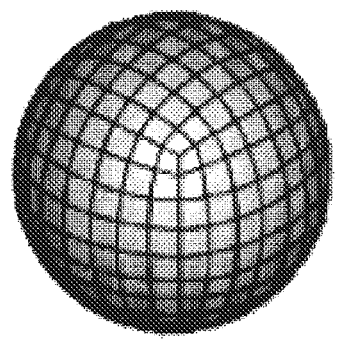
Figure 14E:
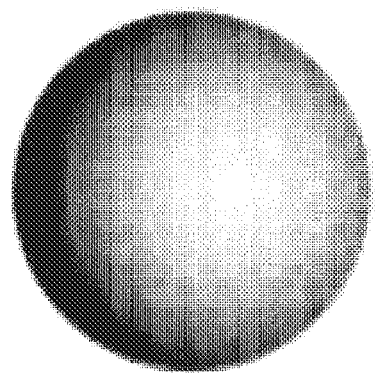

FIGS. 13a to 13c show landmarks computed at different levels of subdivision. FIG. 13a shows a low resolution mesh with a landmark 1310 on the head and a landmark 1320 on the torso. FIG. 13b shows a medium resolution mesh calculated by subdividing the mesh shown in FIG. 13a. The two landmarks 1310 and 1320 are computed for the medium resolution. FIG. 13c shows a high resolution mesh calculated by subdividing the mesh shown in FIG. 13b. Again, the landmarks 1310 and 1320 are computer for the high resolution. The landmarks only have to be defined once at the graph-topology level and can then be computed for any resolution.

Since the CubeShape is made of quads only, the surface can be described using Catmull-Clark subdivision schemes.

FIG. 14 shows different subdivision of the Catmull-Clark subdivision scheme. FIG. 14a shows a cube. FIGS. 14b to 14e show successive subdivisions of the surface to approximate a sphere.

Embodiments of the CubeShape can be seen as a simple way to create the initial coarsest shape (using cubes). In addition to traditional subdivision surface representation, it also gives a simple way to parameterize the shape.

Every patch of a high-resolution CubeShape can be seen as a 2D image (each vertex being a 3D positions). Given a new subdivision vector, generating a lower-resolution mesh is therefore equivalent to subsampling these images.

Figure 15A:
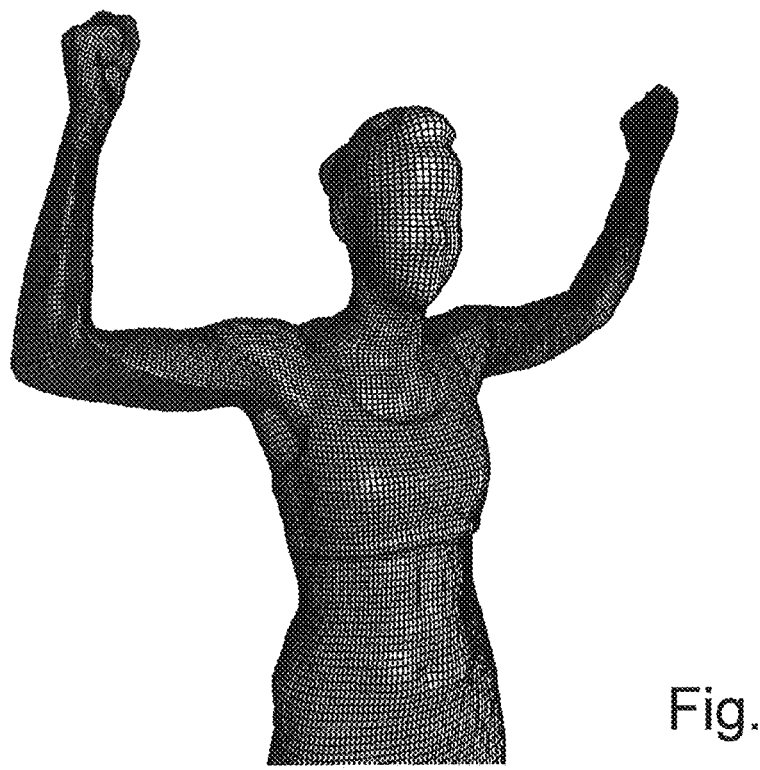
FIG. 15a shows a high resolution mesh in an embodiment.
Figure 15B:
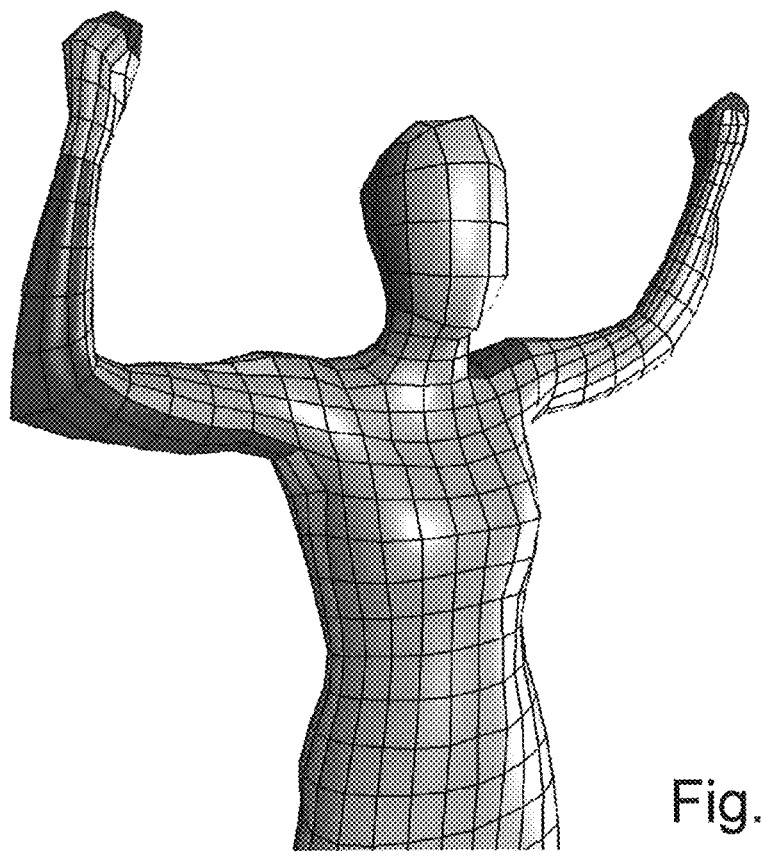
FIG. 15b shows resampling of the high resolution mesh to a low resolution mesh in an embodiment.

FIG. 15a shows a high resolution mesh and FIG. 15b shows resampling of the high resolution mesh to a low resolution mesh.

Because of the constraints imposed by the CubeShape, it can be difficult to model certain parts of the shape. For instance, this is the case with human hands. From a topological point of view, hands can be represented by the CubeShape described so far but one might require a better representation to avoid over-stretching the quads and have better access to individual fingers.

A solution is to model a separate model representing one hand only and then connecting it to the body, granted that the subdivision of the connecting patch matches exactly.

Figure 16A:
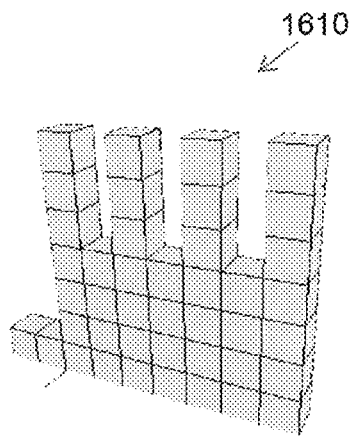
FIGS. 16a to 16e show a hand model according to an embodiment.
Figure 16B:
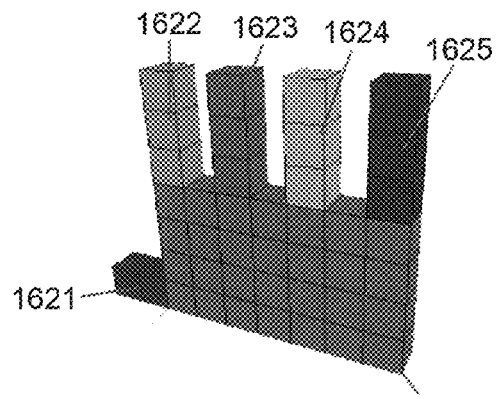

FIGS. 16a to 16e show a hand model according to an embodiment. FIG. 16a shows the arrangement of cubes 1610 which is input by a user. FIG. 16b shows the blocks 1620, 1621, 1622, 1623, 1624, & 1625 defined by the user.

Figure 16C:
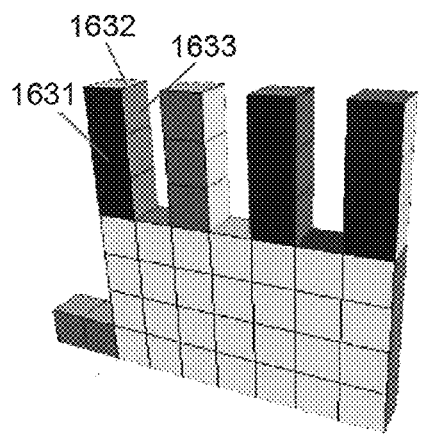

FIG. 16c shows the patches which are computed from the blocks defined in FIG. 16b. As shown in FIG. 16c, three patches 1631, 1632 & 1633 on the block 1622 forming the index finger are visible.

Figure 16D:
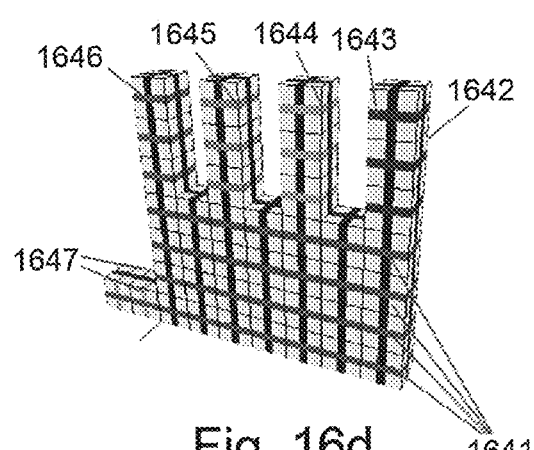

FIG. 16*d* shows the subdivision domain. As shown in FIG. 16*d*, there are 7 subdivision domains: one subdividing the palm top to bottom 1641, one subdividing the hand front to back 1642, five, each subdividing a respective one of the fingers and thumb 1643, 1644, 1645, 1646 & 1647.

Figure 16E:
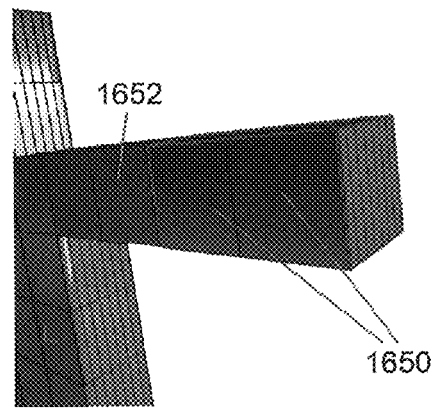

FIG. 16*e* shows how the hand model is connected to the body. The two cubes 1650 at the end of the arm 1652 are replaced by the hand.

It is noted that the left hand can simply be generated as the right/left symmetry of the right hand.

Figure 17:
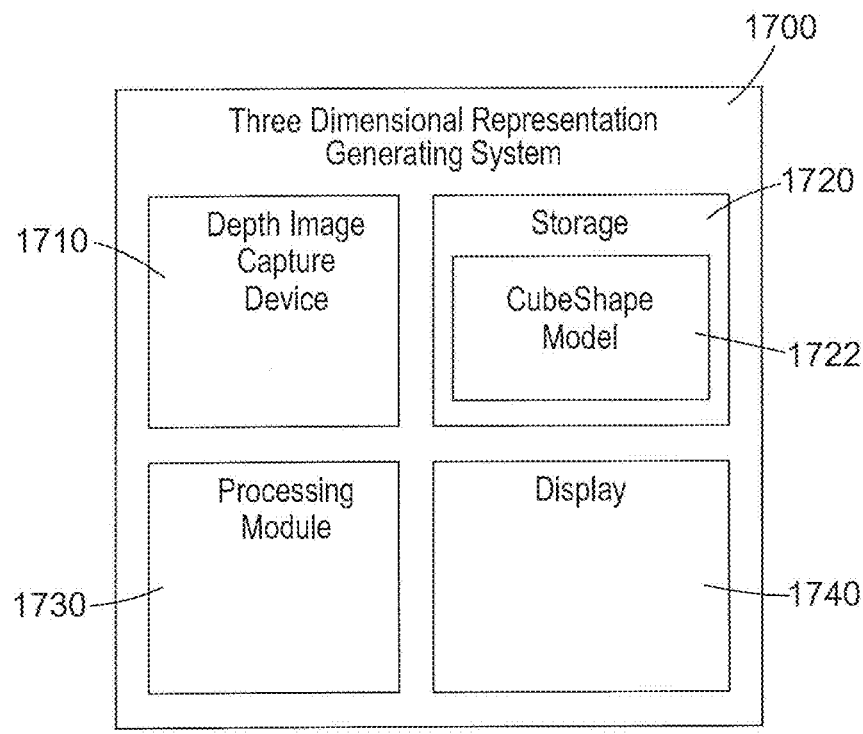
FIG. 17 shows a system for generating a three dimensional representation of a subject from a depth image.

FIG. 17 shows a system 1700 for generating a three dimensional representation of a subject from a depth image. The system comprises a depth image capture device which captures depth data from the subject, storage 1720 which stores a CubeShape model 1722, a processing module 1730 which fits the CubeShape model 1722 to the depth data captured by the depth image capture device 1710 and a display 1740 which displays a result determined by the processor 1730.

The CubeShape model 1722 is the output of the method described above with reference to FIGS. 1 and 2.

Figure 18:
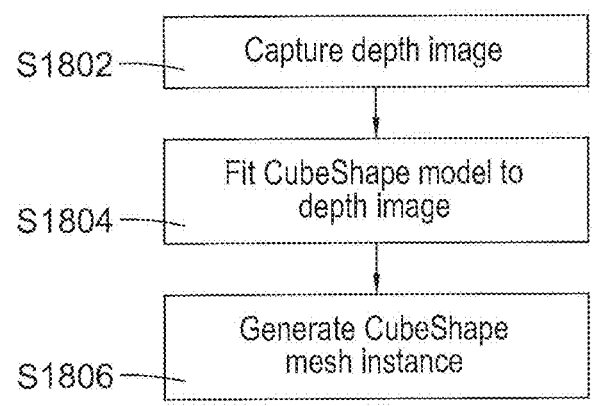
FIG. 18 shows a method of generating a three dimensional representation of a subject according to an embodiment.

FIG. 18 shows a method of generating a three dimensional representation of a subject according to an embodiment.

In step S1802, a depth image of the subject is acquired. In step S1804, a CubeShape model is fitted to the depth data. In step S1806, a CubeShape mesh instance which describes the data is output.

The resolution of the Cube shape model is chosen to match the sensor noise: the noisier the sensor, the coarser the subdivision. It is noted that the CubeShape subdivision capability helps adapting the statistical model to a given sensor. For example, given a more accurate sensor, the statistical model can be re-trained using a higher mesh resolution.

The depth image may be captured by the depth image capture device 1710. Alternatively, the method may be carried out on a depth image transferred to the system 1700 either over a network or on a storage medium.

The method may be started using a manual trigger such as button or a remote control. Alternatively, the method may be triggered by a voice or gesture command.

The method may be automatically triggered in different ways. If a person is detected standing in a particular area the method may be automatically triggered. This detection may be as a result of a detection from the depth image capture device, or by a detection from a separate sensor located on the floor. Alternatively, the method may be triggered if a person is detected as being within the statistical space of pose and shape regardless of their location in the real world. For example, if the system assesses that it can provide a good body shape estimate the method will be triggered.

The output of the system may be a 3D data file including a set of locations in three dimensions and a mesh definition.

In an embodiment the display is configured to display a visualisation of the subject wearing an item of clothing without the need for them to try on the actual product.

In an embodiment, the system is configured to calculate measurements of the subject. The measurements may be discrete sizes, for example, small, medium and large or measurements such as waist or inside leg of the subject.

In the above description, the use of CubeShape as a model for a human is described. Embodiments may also be used to model other subjects.

While certain embodiments have been described, these embodiments have been presented by way of example only, and are not intended to limit the scope of the inventions. Indeed, the novel methods, and systems described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The invention claimed is:

1. A method of generating a three dimensional model of a subject, the method comprising:
receiving point cloud data for a subject;
receiving user inputs indicating a plurality of cubes, and a grouping of the cubes into a plurality of blocks to form a representation of a class of subjects;
generating a first mesh comprising a plurality of quadrilaterals by:
subdividing patches corresponding to faces of blocks of the plurality of blocks,
the subdividing patches comprises subdividing a first patch corresponding to a face of a first block with a first number of subdivisions and subdividing a second patch corresponding to a face of a second block with a second number of subdivisions, the first number of subdivisions being different to the second number of subdivision,
the first block and the second block being adjacent to each other such that they meet at a first edge, the number of subdivisions of the first patch at the first edge being the same as the number of subdivisions of the second patch at the first edge,
the subdivisions of the first patch at the first edge being continuous with the corresponding subdivisions of the second patch at the first edge, and
the patches being subdivided at regular intervals along the first edge;
fitting the first mesh to the point cloud data to generate a fitted mesh;
iteratively generating further meshes for each block of the plurality of blocks, each comprising a plurality of quadrilaterals by subdividing patches of the fitted mesh from the previous iteration and fitting the further mesh to the point cloud data; and
outputting as the three dimensional model of the subject the iteratively generated fitted mesh.

2. The method according to claim 1, wherein subdividing each mesh comprises subdividing patches corresponding to faces of the blocks at regular intervals along each edge of the face.

3. The method according to claim 1, wherein the class of subjects is human subjects.

4. The method according to claim 1, wherein the user inputs further comprise indications of locations of joints in a skeleton of the subject, the method further comprising generating a representative skeleton from the indications.

5. The method according to claim 4, wherein the indications of locations of joints comprise indications of a plurality of rings on the blocks indicating the locations of the joints.

6. The method according to claim 1, wherein the grouping of the cubes into a plurality of blocks comprises an indication of symmetry as correspondences between cubes.

7. The method according to claim 1, further comprising capturing the point cloud data for the subject.

8. A method of generating a statistical model for the three dimensional shape of a class of subjects from three dimensional point cloud data for a plurality of test subjects within the class of subjects, the method comprising, for each test subject of the plurality of test subjects, iteratively generating models of increasing resolution by:
fitting a first mesh to the point cloud data, the first mesh comprising a plurality of quadrilaterals formed by subdividing patches corresponding to faces of blocks of a plurality of blocks, each block of the plurality of blocks formed from at least one cube, to obtain a fitted first mesh,
the subdividing patches comprises subdividing a first patch corresponding to a face of a first block with a first number of subdivisions and subdividing a second patch corresponding to a face of a second block with a second number of subdivisions, the first number of subdivisions being different to the second number of subdivisions,
the first block and the second block being adjacent to each other such that they meet at a first edge, the number of subdivisions of the first patch at the first edge being the same as the number of subdivisions of the second patch at the first edge,
the subdivisions of the first patch at the first edge being continuous with the corresponding subdivisions of the second patch at the first edge, and
the patches being subdivided at regular intervals along the first edge;
generating a second mesh by subdividing the fitted first mesh; and
repeating the fitting and generating steps using the second mesh in place of the first mesh for each block of the plurality of blocks, and
outputting the result of the iteration as a statistical model for the class of subjects.

9. The method according to claim 8, wherein subdividing the first fitted mesh comprises subdividing a patches corresponding to faces of the blocks at regular intervals along each edge of the face.

10. The method according to claim 8, wherein the class of subjects is human subjects.

11. The method according to claim 10, further comprising generating a representative skeleton for each of the test subjects.

12. The method according to claim 8, further comprising enforcing at least one symmetry rule defined by correspondences between blocks of the plurality of blocks.

13. The method according to claim 8, further comprising capturing the three dimensional point cloud data for each of the test subjects.

14. A method of generating a three dimensional representation of a subject from a depth image, the method comprising:
fitting a first mesh to the depth image, the first mesh comprising a plurality of quadrilaterals formed by subdividing patches corresponding to faces of blocks of a plurality of blocks, each block of the plurality of blocks formed from at least one cube.

15. The method according to claim 14, further comprising capturing the depth image of the subject.

16. A system for generating a three dimensional model of a subject, the system comprising:
a processor configured to:
receive user inputs indicating a plurality of cubes, and a grouping of the cubes into a plurality of blocks to form a representation of a class of subjects,
generate a first mesh comprising a plurality of quadrilaterals by subdividing patches corresponding to faces of blocks of the plurality of blocks,
the subdividing patches comprises subdividing a first patch corresponding to a face of a first block with a first number of subdivisions and subdividing a second patch corresponding to a face of a second block with a second number of subdivisions, the first number of subdivisions being different to the second number of subdivisions,
the first block and the second block being adjacent to each other such that they meet at a first edge, the number of subdivisions of the first patch at the first edge being the same as the number of subdivisions of the second patch at the first edge,
the subdivisions of the first patch at the first edge being continuous with the corresponding subdivisions of the second patch at the first edge, and
the patches being subdivided at regular intervals along, the first edge, and
the processor being further configured to:
fit the first mesh to point cloud data for a subject from the class of subjects to generate a fitted mesh, and
iteratively generate further meshes for each block of the plurality of blocks, each comprising a plurality of quadrilaterals by subdividing patches of the fitted mesh from the previous iteration and fitting the further mesh to the point cloud data,
the system being configured to output as the three dimensional model of the subject the iteratively generated fitted mesh.

17. A non-transitory computer readable carrier medium carrying processor executable instructions which when executed on a processor cause the processor to carry out the method according to claim 1.

18. A non-transitory computer readable carrier medium carrying processor executable instructions which when executed on a processor cause the processor to carry out the method according to claim 8.

* * * * *